United States Patent
Brühwiler

(10) Patent No.: US 9,404,391 B2
(45) Date of Patent: Aug. 2, 2016

(54) DIFFUSER FOR THE EXHAUST SECTION OF A GAS TURBINE AND GAS TURBINE WITH SUCH A DIFFUSER

(71) Applicant: ALSTOM Technology Ltd, Baden (CH)

(72) Inventor: Eduard Brühwiler, Turgi (CH)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 527 days.

(21) Appl. No.: 13/929,462

(22) Filed: Jun. 27, 2013

(65) Prior Publication Data

US 2014/0003931 A1 Jan. 2, 2014

(30) Foreign Application Priority Data

Jun. 28, 2012 (EP) ..................................... 12004853

(51) Int. Cl.
| | |
|---|---|
| F02K 1/04 | (2006.01) |
| F02K 1/80 | (2006.01) |
| F02K 1/82 | (2006.01) |
| F02C 7/24 | (2006.01) |
| F01D 25/30 | (2006.01) |

(52) U.S. Cl.
CPC . *F01D 25/30* (2013.01); *F02C 7/24* (2013.01); *F02K 1/04* (2013.01); *F02K 1/80* (2013.01); *F02K 1/822* (2013.01); *F05D 2230/642* (2013.01); *Y02T 50/675* (2013.01)

(58) Field of Classification Search
CPC ..... F01D 25/24; F01D 25/243; F01D 25/246; F01D 25/28; F01D 25/30; F02C 7/24; F02K 1/82; F02K 1/822; F02K 1/04; F02K 1/80
See application file for complete search history.

(56) References Cited

U.S. PATENT DOCUMENTS

| | | | |
|---|---|---|---|
| 2,544,538 A | 3/1951 | Mahnken et al. | |
| 3,826,088 A * | 7/1974 | Nash | C07D 277/587 285/123.1 |

(Continued)

FOREIGN PATENT DOCUMENTS

| | | | |
|---|---|---|---|
| CH | EP 2957730 A1 * | 12/2015 | ............. F01D 9/042 |
| CN | 101680305 A | 3/2010 | |

(Continued)

*Primary Examiner* — Igor Kershteyn
*Assistant Examiner* — Christopher R Legendre
(74) *Attorney, Agent, or Firm* — Buchanan Ingersoll & Rooney PC

(57) ABSTRACT

The invention relates to a diffuser for the exhaust section of a gas turbine, comprising at least one cone extending along a machine axis and bordering a channel for an exhaust flow, whereby said at least one cone has a wall with an internal structure comprising a plurality of longitudinal liner segments extending in an axial direction and establishing a conical liner being in contact with the exhaust flow, a support structure coaxially arranged with respect to said conical liner in a predetermined distance, and an insulation filling the space between said conical liner and said support structure. A smooth inner surface and a safe compensation of different thermal expansions are achieved by having each of said liner segments fixed in a lateral direction at one fixing point, and having each liner segment supported at a plurality of distributed points outside said fixing point by means of supporting elements, which are confined to the space between said conical liner and said support structure and allow for a lateral thermal expansion of the liner segments.

10 Claims, 5 Drawing Sheets

(56) References Cited

U.S. PATENT DOCUMENTS

| | | | | |
|---|---|---|---|---|
| 4,137,992 | A | * | 2/1979 | Herman ............... G10K 11/172 181/213 |
| 4,864,818 | A | * | 9/1989 | Taylor ....................... F02K 1/80 60/766 |
| 4,944,151 | A | | 7/1990 | Hovnanian |
| 5,104,286 | A | | 4/1992 | Donlan |
| 5,485,959 | A | * | 1/1996 | Wood ....................... F02K 1/002 239/265.19 |
| 5,669,812 | A | | 9/1997 | Schockemoehl et al. |
| 6,807,803 | B2 | | 10/2004 | Poccia et al. |
| 7,861,535 | B2 | * | 1/2011 | Figueroa ................... F02C 7/20 60/766 |
| 7,866,158 | B2 | * | 1/2011 | Murphy .................... F02K 1/82 60/770 |
| 8,800,300 | B2 | * | 8/2014 | Hashimoto ............. F01D 25/30 239/265.11 |
| 9,243,515 | B2 | * | 1/2016 | McAlice ................. F01D 25/14 |
| 9,243,654 | B2 | * | 1/2016 | Hayton ..................... F16B 5/00 |
| 9,249,732 | B2 | * | 2/2016 | McAlice ................... F02K 1/82 |
| 2004/0107690 | A1 | * | 6/2004 | Poccia .................... F02K 1/822 60/39.5 |
| 2009/0077978 | A1 | | 3/2009 | Figueroa et al. |
| 2010/0226767 | A1 | * | 9/2010 | Becker ...................... F01D 9/02 415/207 |
| 2011/0088379 | A1 | * | 4/2011 | Nanda ..................... F01D 25/30 60/324 |
| 2014/0003931 | A1 | * | 1/2014 | Bruhwiler ............... F01D 25/30 415/211.2 |
| 2015/0028166 | A1 | * | 1/2015 | Hayton ................... F01D 25/12 248/60 |
| 2015/0128602 | A1 | * | 5/2015 | Clemen ................... F16B 11/00 60/754 |

FOREIGN PATENT DOCUMENTS

| | | |
|---|---|---|
| CN | 101960101 A | 1/2011 |
| CN | 201794627 U | 4/2011 |
| CN | 102042048 A | 5/2011 |
| JP | 60-219420 | 11/1985 |
| JP | H07-22108 | 4/1995 |

* cited by examiner

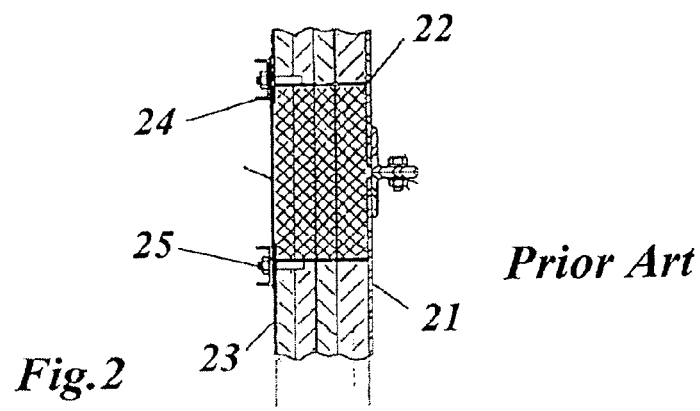
*Fig.2* *Prior Art*
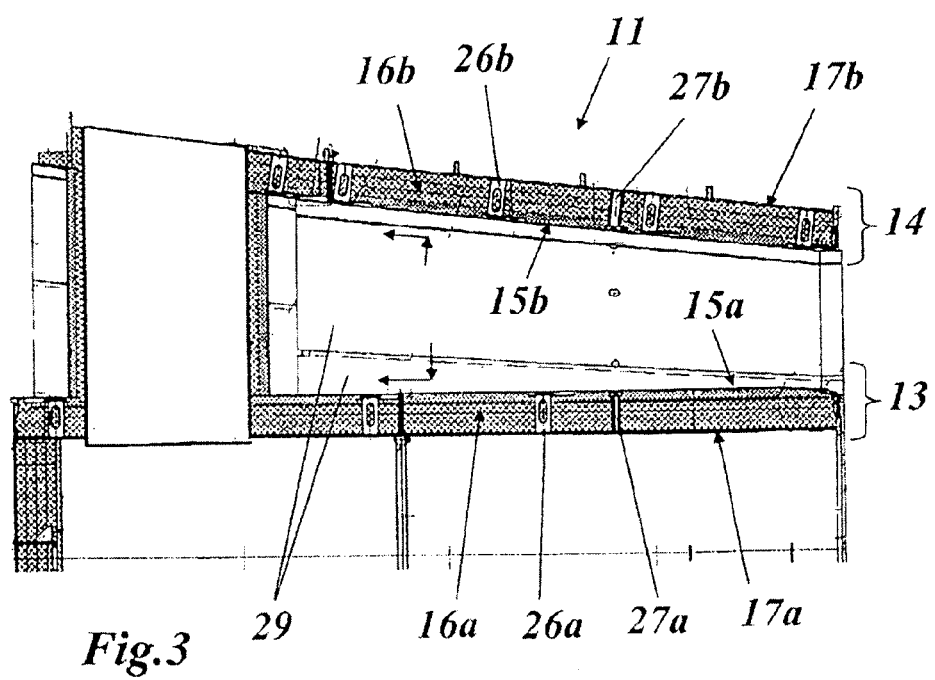
*Fig.3*

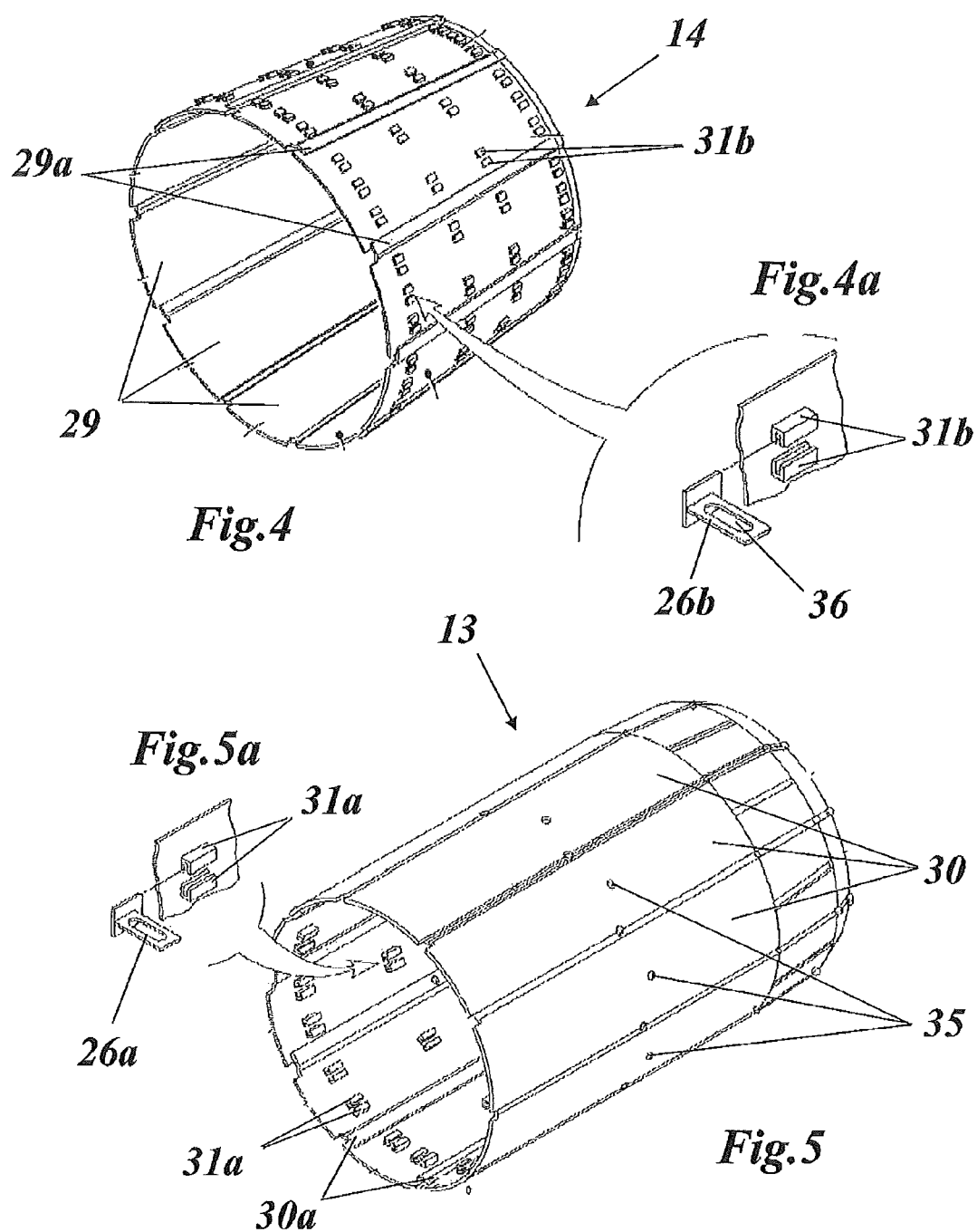

DIFFUSER FOR THE EXHAUST SECTION OF A GAS TURBINE AND GAS TURBINE WITH SUCH A DIFFUSER

CROSS-REFERENCE TO RELATED APPLICATIONS

This application claims priority to EP Application Number 12004853.3 filed Jun. 28, 2012, the contents of which is hereby incorporated in its entirety.

BACKGROUND

The present invention relates to gas turbines. It further refers to a gas turbine with a diffuser.

In gas turbines, especially those for combined cycle applications, the exhaust gas temperatures are so high that the support structure of the exhaust duct is no longer allowed to come into contact with the exhaust gas. Thus, the support structure of the exhaust duct has to be protected by means of an insulation, which then has to be covered and protected by liner segments. Exhaust ducts and diffusers of that kind are for example disclosed in documents U.S. Pat. No. 5,104,286 A, U.S. Pat. No. 5,669,812 A and U.S. Pat. No. 6,807,803 B2.

FIG. 1 shows the principle configuration of an exhaust section of such a gas turbine. The exhaust gases emerging from the gas turbine 10 are expanded in a conical diffuser 11 and then enter an exhaust duct 12, which leads the exhaust flow 18 to a stack 19, not shown. The diffuser 11 comprises an inner cone 13 and an outer cone 14, which are coaxially arranged with respect to a machine axis 34. The walls of the inner cone 13 and outer cone 14 and exhaust duct 12 each have an internal structure comprising a liner 15, an intermediate insulation 16 and a support structure 17. Depending on the specific configuration the inner and outer cone 13, 14 can also be cylindrical.

The fixation of the liners is difficult due to several problems:
- as the support structure is cold and the liner is hot, there are different thermal expansions, which have to be safely absorbed by the fixtures or fixing means;
- the fixtures cross the insulation, thereby creating thermal bridges;
- the side of the liner exposed to the exhaust flow must be as flat as possible to avoid disturbing the flow and creating turbulent flow; as the liner has to be mounted somehow, this is hard to achieve;
- longitudinal ribs extending into the flow are tolerable for some parts with not too high flowing velocity; however, they cannot be tolerated in the diffuser section, as in this section there may be still an exhaust gas swirl and longitudinal ribs may reduce the diffuser efficiency; therefore, an aim should be to have a smooth surface of the liner at its exhaust flow side, especially in the diffuser section.

FIG. 2 shows an exemplary prior art solution, where the wall comprises a support structure 21, an intermediate insulation and a liner 23, which is fixed by means of U profiles 24 and threaded joints 25, which disadvantageously extend into the exhaust flow.

Experience has further shown that the nuts, which are secured to the threaded bolts by means of welding points, break off, thereby putting the fixation at risk.

SUMMARY

It is an object of the present invention to provide a diffuser, which avoids the disadvantages of the prior art solutions and combines a smooth inner surface with a safe compensation of different thermal expansions, especially during transient conditions of the gas turbine.

This and other objects are obtained by a diffuser according to claim 1.

The diffuser according to the invention comprises at least one cone extending along a machine axis and bordering a channel for an exhaust flow, whereby said at least one cone has a wall with an internal structure comprising a plurality of longitudinal liner segments extending in axial direction and establishing a conical liner being in contact with the exhaust flow, a support structure coaxially arranged with respect to said conical liner in a predetermined distance, and an insulation filling the space between said conical liner and said support structure.

The diffuser according to the invention is characterized in that each of said liner segments is fixed in lateral direction (i.e. circumferential and longitudinal direction) at one fixing point, and that each liner segment is supported at a plurality of distributed points outside said fixing point by means of supporting elements, which are confined to the space between said conical liner and said support structure and allow for a lateral thermal expansion of the liner segments.

According to an embodiment of the invention the diffuser comprises an inner cone and an outer cone, which are arranged coaxially and have each a plurality of longitudinal liner segments extending in axial direction and establishing a conical liner being in contact with the exhaust flow, a support structure coaxially arranged with respect to said conical liner in a predetermined distance, and an insulation filling the space between said conical liner and said support structure, whereby each of said liner segments is fixed in lateral direction at one fixing point, and each liner segment is supported at a plurality of distributed points outside said fixing point by means of supporting elements, which are confined to the space between said conical liner and said support structure and allow for a lateral thermal expansion of the liner segments.

According to another embodiment of the invention the supporting elements each comprise a pair of C profiles, which are welded to the back surface of the liner segments thereby defining a slotted guiding channel running parallel to said back surface, and a T support, which is welded to the respective support structure with its base and engage with its cross beam said pair of C profiles at said slotted guiding channel.

Specifically, said C profiles are welded to the respective liner segment with a circumferential seam. The weld seam, which can for example be a fillet seam, leads to a good heat flow from the liner to the C profiles.

According to a further embodiment of the invention the base of each T support has an oval hole to minimize heat transport through the T support to the support structure.

According to another embodiment of the invention each pair of C profiles is arranged such that the slotted guiding channel defined by them runs in axial direction.

According to adjust another embodiment of the invention, in order to fix said liner segments in lateral direction at said fixing points a fixing means connected to the support structure is provided at each fixing point.

Specifically, said fixing means comprises a gudgeon, which is welded to the liner segment during assembly and engages with a ring fixed at one end of a radial tube, which tube is welded to the support structure at its other end.

According to another embodiment of the invention neighbouring liner segments of a cone overlap each other with an overlapping strip, which is bend into the respective liner segment.

Specifically, in case of an outer cone, the overlapping is configured such that at the 6 o'clock position of the liner a kind of flume results, which prevents a possible liquid running down the diffuser from dripping through the liner into the insulation.

The inventive gas turbine is equipped with a diffuser according to the invention.

BRIEF DESCRIPTION OF THE DRAWINGS

The present invention is now to be explained more closely by means of different embodiments and with reference to the attached drawings.

FIG. 2 shows the internal structure of a wall known the prior art;

FIG. 3 shows a longitudinal section of the diffuser according to an embodiment of the invention comprising an inner cone and an outer cone;

FIG. 4 shows in a perspective view the arrangement of the liner segments of the outer cone of the diffuser according to FIG. 3;

FIG. 4a shows in a magnified view the elements of an expansion-tolerant connection between the liner segments and the support structure for the outer cone of FIG. 4;

FIG. 5 shows in a perspective view the arrangement of the liner segments of the inner cone of the diffuser according to FIG. 3;

FIG. 5a shows in a magnified view the elements of an expansion-tolerant connection between the liner segments and the support structure for the inner cone of FIG. 5;

DETAILED DESCRIPTION

The characteristic features of the present invention can be outlined as follows:

for each liner segment there is only one fixing point with a fixing means connecting the liner segment and the underlying support structure;

the liner segment is free to thermally expand stress-free in different (lateral) directions outside of the fixing point;

neighbouring liner segments overlap to protect the underlying insulation against the hot exhaust flow;

the overlapping sections (strips) formed by bending stiffen the liner segments thereby reducing natural resonances of the segment;

C profiles used to establish an expansion-tolerant connection between the liner segments and the support structure are circumferentially welded to the liner segments, and are small enough to have always the same temperature as the liner segments, so that thermal stress between profile and segment is avoided;

the fixing point/fixing means fixes only the plane of the liner segment; all other degrees of freedom are not blocked so that the liner segment has many possibilities to move, respectively to rotate, which is important for transient conditions of the machine.

The present solution has been developed to fulfil the requirement that for aerodynamic reasons no fixing parts shall extend into the exhaust flow at the diffuser section.

Figure 8:
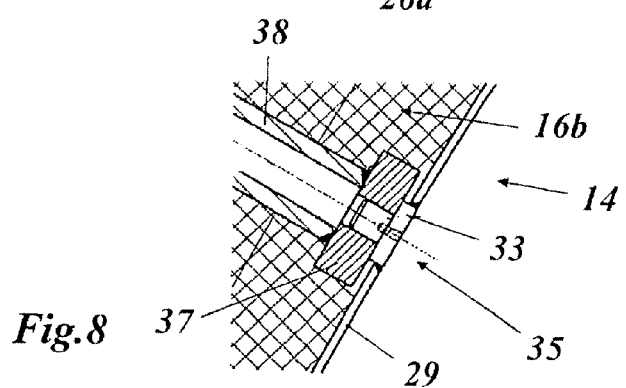
FIG. 8 shows the connection between a fixing means and a liner segment for a diffuser according to FIG. 3.
Figure 9:
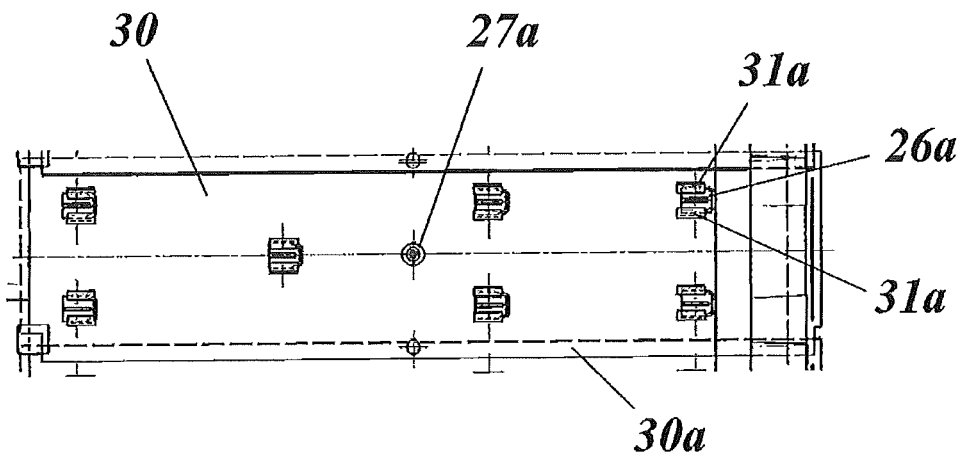
FIG. 9 shows a view on the liner segment of the inner cone for a diffuser according to FIG. 3.

As shown in FIG. 3-5, the liners 15a and 15b of the inner cone 13 and outer cone 14 with their liner segments 29 and 30 are each fixed at one fixing point (35 in FIGS. 5 and 8) by means of a fixing means 27a and 27b. Outside the fixing point the liner segments 29 and 30 of the liners 15a and 15b are connected to the respective support structure 17a and 17b by means of distributed T supports 26a and 26b. These T supports 26a,b are welded to the support structure 17a,b with their base and engage each with its cross beam a pair of C profiles 31a,b welded to the back surface (insulation side) of the liner segments 29, 30 thereby defining a slotted guiding channel running parallel to said back surface (FIGS. 4, 4a and 5, 5a).

The liner segments 29 and 30 are fixed in their position at the fixing points 35. The C profiles 31a,b are aligned in the longitudinal direction of the segments or the flow or axial direction, respectively. This allows an easy mounting even in the presence of the insulation 16a,b, as can be seen in FIG. 3 (see the rectangular or nearly rectangular mounting arrows). Moreover, the liner segments 29 and 30 can freely expand in the longitudinal direction (flow or axial direction).

Figure 1:
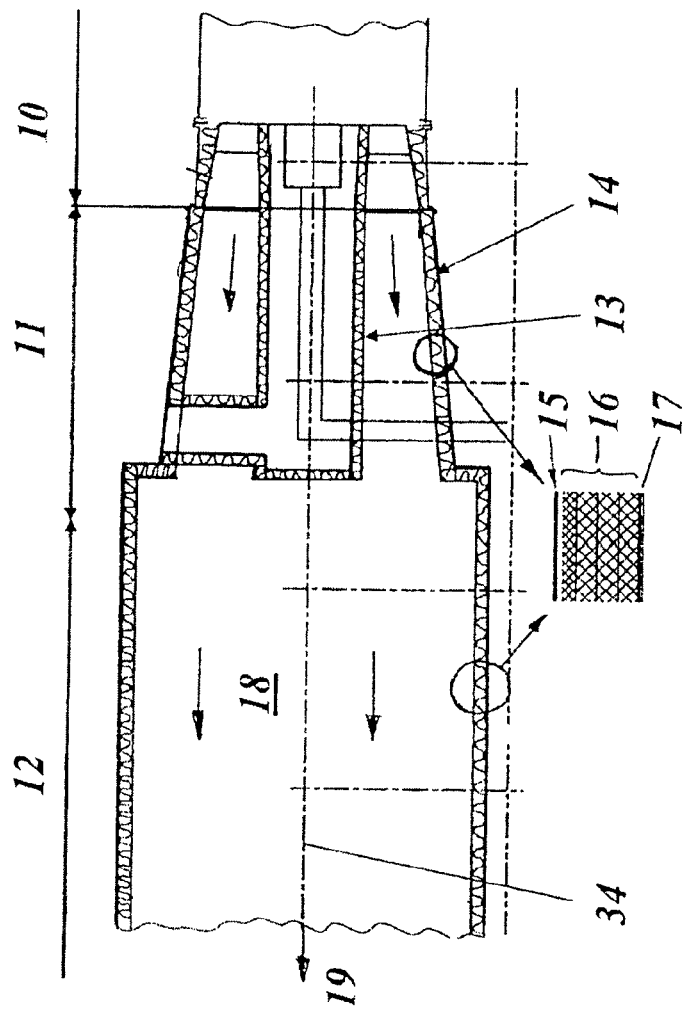
FIG. 1 shows a principle configuration of the exhaust side of a gas turbine and the internal structure of a respective wall.
Figure 6:
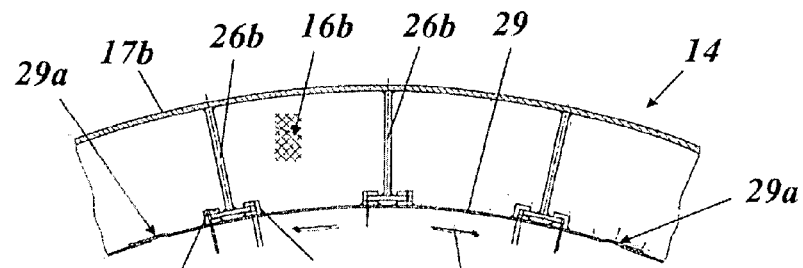
FIG. 6 shows a cross section of the outer cone of FIG. 3 with the directions of thermal expansion of a liner segment.
Figure 7:
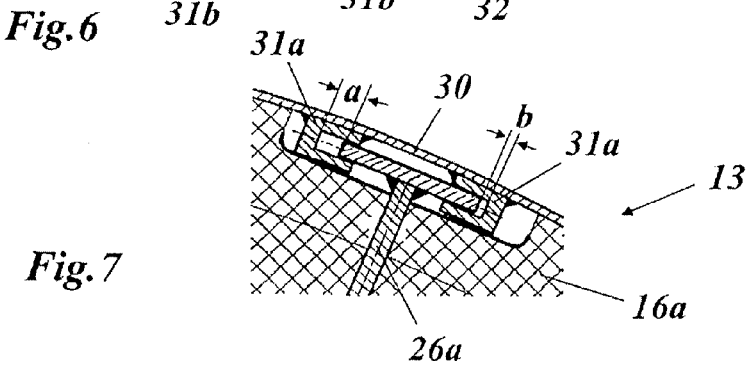
FIG. 7 shows in a magnified view the connection between T support and support structure and the cold play involved for a diffuser according to FIG. 3.

As shown in FIGS. 6 and 7, expansion in circumferential direction is made possible by providing different cold plays a and b at opposite sides of the cross beam of the T support 26a,b or opposite C profiles, respectively.

At the fixing points 35, fixing means 27a,b fix the liner segments 29, 30 only in longitudinal and circumferential direction. This is achieved by means of a gudgeon 33 which is welded to the liner segment during assembly and engages with a ring 37 fixed at one end of a radial tube 38, which tube 38 is welded to the support structure 17a,b with its other end. Other movements and tolerances, for example perpendicular to the segment plane, are possible without generating stress.

The base of each T support 26a,b has an oval hole (36 in FIG. 4b) to minimize heat transport to the support structure. The advantage of a combination of C profiles and T supports is a small contact area, which reduces heat transport between liner segment and T support base and hence the support structure.

Each C profile 31a,b can be welded to the liner segment with a circumferential weld seam. In connection with the comparatively big contact area between both parts this results in a good heat transport from the liner segment to the C profile. As a consequence, no substantial thermal stress is generated at the welding seam during transient conditions like starting and stopping the gas turbine.

To achieve a smooth overall surface the contact area between neighbouring liner segments is designed in an overlapping fashion, whereby one liner segment overlaps the other with an overlapping strip 29a, 30a. The overlapping strips 29a, 30a are formed by bending the respective liner segment. This leads to an enhanced stiffness of the liner segment without changing its thickness.

Figure 10:
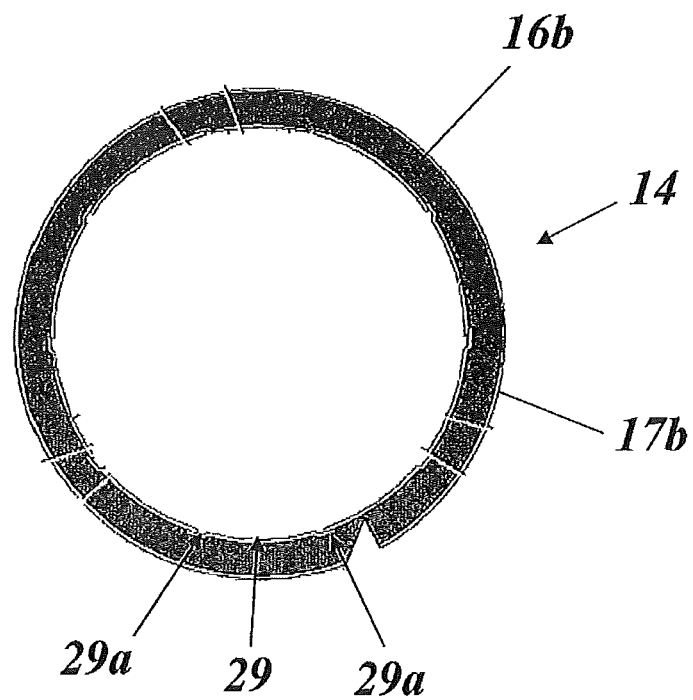
FIG. 10 shows a cross-section of the outer cone of the diffuser according to FIG. 3 with a special overlapping of some the liner segments.

As can be seen especially in FIG. 10, there are two liner segments at 6 o'clock position and 12 o'clock position, which differ from the other liner segments with respect to overlapping. While all other liner segments have only one overlapping strip, these two liner segments have two overlapping strips at opposite sides. For the liner segment at the 6 o'clock position this configuration results in a kind of flume, which prevents a possible liquid running down the diffuser from dripping through the liner into the insulation.

What is claimed is:

1. A diffuser for the exhaust section of a gas turbine, comprising:
    at least one cone extending along a machine axis and bordering a channel for an exhaust flow, wherein the at least one cone has a wall with an internal structure comprising a plurality of longitudinal liner segments extending in an axial direction and establishing a conical liner being in contact with the exhaust flow;
    a support structure coaxially arranged with respect to the conical liner in a predetermined distance;
    an insulation filling the space between the conical liner and the support structure, each of the liner segments being in a circumferential and longitudinal direction at one fixing point to the support structure, and each liner segment being supported from the support structure at a plurality of distributed points outside the fixing point by supporting elements which are confined to the space between the conical liner and the support structure; and
    the supporting elements each comprising:
        a pair of C profiles, which are welded to a back surface of the liner segments thereby defining a slotted guiding channel running parallel to the back surface, and
        a T support, which is welded to the respective support structure with a base of the T support and engages the pair of C profiles at the slotted guiding channel with a cross beam of the T support.

2. The diffuser according to claim 1, wherein the at least one cone comprises an inner cone and an outer cone, which are arranged coaxially.

3. The diffuser according to claim 1, wherein the C profiles are welded to the respective liner segment with a circumferential weld seam.

4. The diffuser according to claim 1, wherein the base of each T support includes a hole to minimize heat transport through the T support to the support structure.

5. The diffuser according to claim 1, wherein each pair of C profiles is arranged such that the slotted guiding channel defined by them runs in axial direction.

6. The diffuser according to claim 1, further comprising a gudgeon connected to the support structure at each fixing point in order to fix the plurality of liner segments in the lateral direction at the fixing points.

7. The diffuser according to claim 6, wherein the gudgeon is welded to each of the plurality of liner segments during assembly and engages with a ring fixed at one end of a radial tube, which tube is welded to the support structure at its other end.

8. The diffuser according to claim 1, wherein neighboring liner segments of one of the at least one cone overlap each other with an overlapping strip, which is bent into the respective liner segment.

9. The diffuser according to claim 8, wherein the at least one cone is an outer cone, and the overlapping is configured at the 6 o'clock position of the liner to prevent liquid running down the diffuser from dripping through the liner into the insulation.

10. Gas turbine comprising a diffuser according to claim 1.

* * * * *